UNITED STATES PATENT OFFICE.

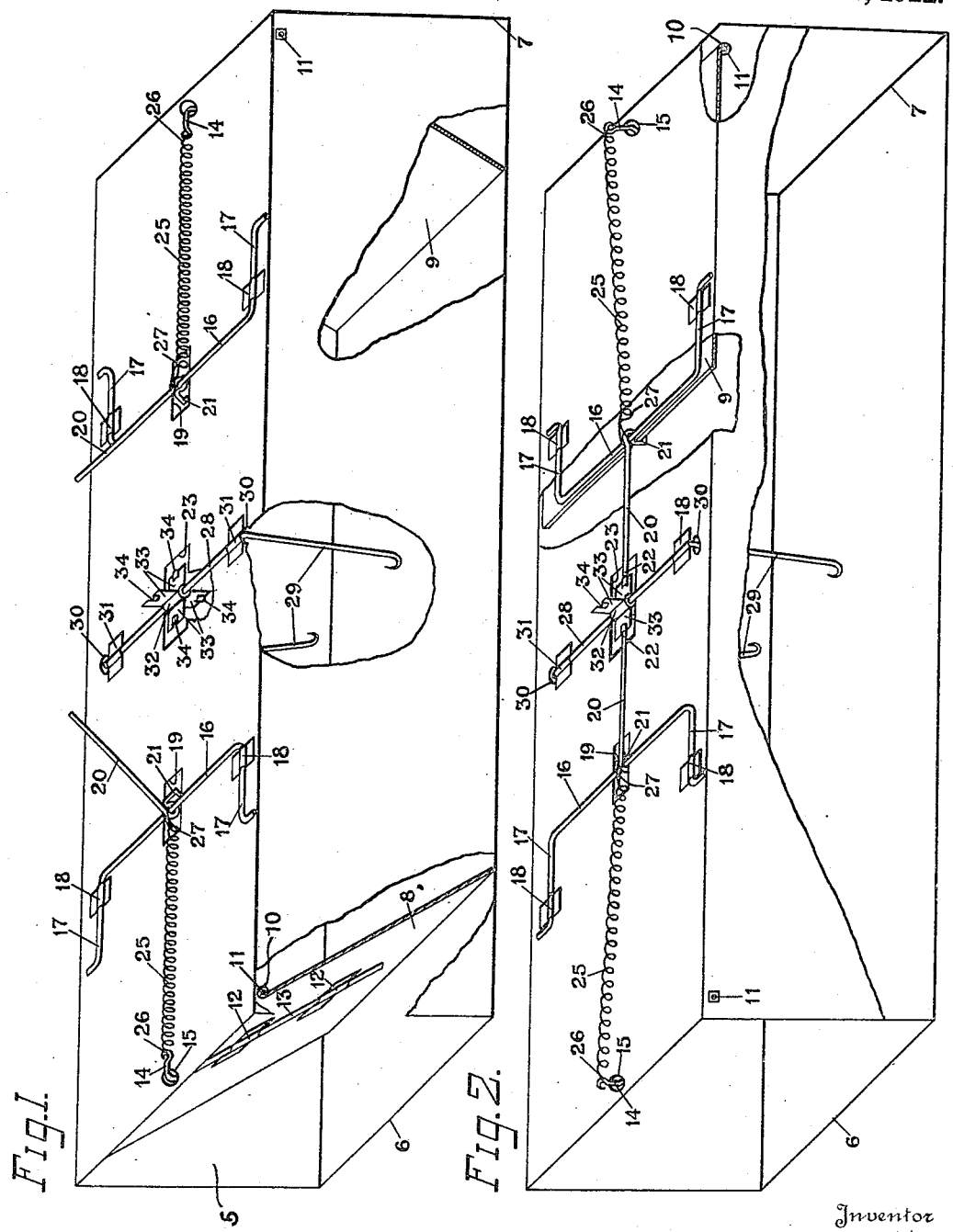

JOHN A. DORSETH, OF FLOM, MINNESOTA.

TRAP.

1,410,738.  Specification of Letters Patent.  Patented Mar. 28, 1922.

Application filed June 13, 1921. Serial No. 477,253.

*To all whom it may concern:*

Be it known that I, JOHN A. DORSETH, a citizen of the United States, residing at Flom, in the county of Norman and State of Minnesota, have invented certain new and useful Improvements in Traps, of which the following is a specification, reference being had to the accompanying drawings.

This invention relates to traps and has for its object to provide a trap having a double entrance, and wherein the doors for closing said entrance are released by a trigger mechanism common to both doors.

It is also an object of the invention to provide a trap having a novel trigger mechanism for controlling a pair of doors, said trigger being arranged to automatically release the doors, regardless of the door controlling the entrance through which the rodent may have passed.

It is another object of the invention to provide a trap of this character wherein the doors for closing the entrances to the trap are not actuated until the rodent reaches the center of the trap so that all possibility of retreat is prevented.

It is still a further object of the invention to provide a trap of this character which does not resemble a trap, cage or compartment when set, as both ends of the trap are open.

With these and other objects in view the invention consists in the improved construction and arrangement of parts to be hereinafter more particularly described, fully claimed and illustrated in the accompanying drawings, in which:—

Figure 1 is a perspective view partly in section of a trap constructed in accordance with an embodiment of the invention, and showing the position of the parts after the trap has been operated, Figure 2 is a perspective view partly in section, showing the position of the parts when the trap is set.

Referring to the drawings, 5 designates the casing of the trap, said casing may be of any shape desired, preferably rectangular in cross section and open at its ends 6 and 7 so that an unobstructed passage is provided through both ends of the trap. The entrance or end 6 of the trap is adapted to be closed by a door 8, while the entrance or end 7 is adapted to be closed by a door 9. As the construction of the doors and holding and releasing mechanism thereof are similar in construction, a description of one will suffice for both.

Each trap door is provided at its upper portion with a bearing 10 which extends laterally of the door and is adapted to receive a bolt 11, the head of the bolt being adapted to extend through the side of the trap. The opposite end of the bolt is adapted to extend through the opposite side of the trap, to serve as a pivot for the door. Secured to the outer face of the door, in spaced relation to each other, is a pair of bearings 12 adapted to receive a rod 13. One end of the rod is formed into a hook 14 and is adapted to extend through an opening 15 formed in the top of the casing 5, the hook being substantially offset with relation to the rod 13. The opening 15 is of a size sufficient to permit movement of the offset portion of the hook therethrough during movement of the door.

Carried by the top of the casing 5, midway between the intermediate portion of said casing and the end thereof, is a door or holding and releasing mechanism comprising a substantially U-shaped member 16, the arms 17 of which are slidably mounted in bearings 18 secured to the top of the casing, the extremities of the arms 17 being disposed at right angles to prevent disengagement of the arms from the bearings. The intermediate portion of the member 16 is disposed over a relatively large opening 19 formed in the top of the casing, the purpose of which will be hereinafter described. A door holding arm 20 is provided, one end of said arm being coiled around the intermediate portion of the member 16 for oscillating movement on said member, and having its extremity formed into a hook 21, the hook being adapted to extend through the opening 19, while the body portion of the arm is disposed above the casing, the end 22 of the arm extending over a relatively large opening 23 provided in the central portion of the top of the casing.

A spring 25 is disposed upon the top of the casing, the end 26 of the spring being connected to the hook 14 of the rod 13, while the end 27 is connected to the arm 20 adjacent the connections of the arm 20 to the member 16. The lower end of the door is adapted to engage the hook 21, whereby the door is held parallel to the top of the casing when the trap is set, and release of the arm 20 will cause the spring 25 to swing the arm upwardly and thereby release the door and permit the same to move toward the entrance through the medium of the spring 25 and gravity.

The holding arm 20 of each of the holding and releasing mechanisms for controlling the doors extend toward each other and have their ends 22 disposed over the opening 23. These arms are controlled by a single trigger mechanism embodying a substantially U-shaped bait holding member 28, the arms 29 of which are adapted to extend through openings 30 formed in the top of the casing, while the extremities of said arms are formed into bait holding hooks. The bight portion of the member is journaled in bearings 31 disposed adjacent the opening 23, while mounted on the intermediate portion of the member 28 is a trigger. The trigger comprises a sleeve 32 which is rotatably mounted on the holding member 28, said sleeve being adapted to frictionally engage the holding member so that while it may be rotated, at the same time, any movement of the arms 28 will cause corresponding movement of the trigger. The sleeve is provided with a plurality of fingers 33 which radiate therefrom, each of said fingers having a recess 34 formed therein and adapted to receive the ends 22 of the arms 20. The trigger is adapted to extend through the opening 23 and is prevented from movement when engaged by both arms 20. It will be noted that the trigger is provided with four fingers so that the trap may be readily set without requiring the trigger to be rotated. Furthermore, the uppermost finger or the one that is not to be used serves as a handle to properly position the trigger for setting of the trap. It is of course obvious that any one of the four fingers of the trigger may be used in setting the trap. However, the purpose of providing four fingers is to facilitate setting of the trap by permitting the fingers that are disposed, or partially disposed within the opening 23 or substantially parallel with the top of the trap, to be used in setting the same. The lowermost finger may be also used as a handle if the operator desires to set the trap by inserting the hand within the trap.

In the operation of the device, the doors are swung inwardly and upwardly and engaged with the hooks 21, each of the arms 20 being swung toward the top and the extremity of each arm being engaged with the edge of one of the adjacent fingers 33 of the trigger. In this way, oscillating movement of the trigger is prevented. When the trap is set, the springs 25 are of course under tension. At the same time, this tension does not interfere with the setting of the trap as the members 16 are movable so as to permit ready engagement of the hooks with the doors. When the animal enters the trap it passes entirely through the entrance. Upon reaching the center of the trap, and touching the bait on the hooks of the member 28, movement of said member in either direction will cause corresponding movement of the trigger, and as only a small portion of the arms 20 are engaged with the trigger fingers, only a slight oscillating movement of the trigger is necessary to cause one of the arms 20 to be disengaged from one of said fingers and upon disengagement of said arm, the remaining arm will be disengaged in view of the absence of obstruction by said released arm on the opposite side of the trigger. The disengagement of the arm 20 upon oscillating movement of the trigger is assisted by the retracting movement of the spring 25 which serves to move the member 16 away from the trigger member so as to prevent binding of the arm with respect to the trigger. At the same time the retraction of the spring also reduces the resistance offered by the spring to the trap door, thereby facilitating its downward movement through the medium of gravity. The same operation is common to both of the arms 20 so that both arms may be rapidly raised through the medium of the springs. As the springs 25 are connected to the arms 20 above or beyond the connection of the arms to the member 16, there will be no interference with the upward movement of the arms. After the release of the arms, the movement thereof causes the doors to be disengaged from the hooks 21 and permits the springs to also swing the doors downwardly to close both entrances to the trap almost simultaneously. It will be noted that the doors 8 and 9 are not disposed flush with the ends 6 and 7, but are inclined inwardly so that pressure upon the rear of the door will not permit the same to be forced outwardly, so that danger of escape is prevented.

From the foregoing it will be readily seen that this invention provides a novel form of trap which when set provides an unobstructed passage from one end of the trap to the other, with the exception of the depending bait holding member which not only permits the rodent to enter from either end of the casing, but permits light to enter the trap from both ends. In addition to this, the instant the bait holding member is operated, both doors are released to instantly close the entrance before the rodent has time to escape. Another feature is that the trigger mechanism is disposed exteriorly of the casing so that it may be readily reached by the operator for setting.

What is claimed is:—

1. A trap of the character described comprising a casing having an entrance opening at each end, a door mounted adjacent each entrance for closing the same, holding means mounted upon the casing and adapted to engage a portion of the door to hold the same in its open position, means for connecting said holding means to another portion of the door, and a trigger mechanism carried by the casing, said trigger mechanism being common to the holding mechanism of each door, whereby said doors are closed substantially simultaneously.

2. A trap of the character described comprising a casing having an entrance opening at each end, a door pivoted in said openings, a spring connected to the pivoted end of each door, the opposite end of said spring being connected to a holding member mounted upon the casing, a portion of said holding member being adapted to engage the free end of the door, a trigger mechanism carried by the casing, said trigger mechanism being engaged by the holding members of the doors, whereby actuation of said trigger will cause movement of the holding members and release of the doors.

3. A trap of the character described comprising a casing having an entrance opening at each end, doors for closing said entrances, each of said doors having an arm projecting therefrom and through the top of the casing, a spring connected to said arm, the opposite end of the spring being connected to a holding arm movably mounted on the casing, said holding arm having a hook member projecting through the casing and adapted at certain times to engage the free end of the door to hold said door in its open position, a trigger mechanism carried by the casing, said trigger mechanism being adapted to be engaged by the ends of the holding arms, and means for actuating said trigger to cause release of the arms, whereby the hook members are disengaged from the doors and the doors swung to their closed position through the medium of the springs.

In testimony whereof I hereunto affix my signature.

JOHN A. DORSETH.